United States Patent
Ulaganathan et al.

(10) Patent No.: US 10,282,827 B2
(45) Date of Patent: May 7, 2019

(54) METHOD AND SYSTEM FOR REMOVAL OF RAIN STREAK DISTORTION FROM A VIDEO

(71) Applicant: Wipro Limited, Bangalore (IN)

(72) Inventors: Sethuraman Ulaganathan, Tiruchirapalli (IN); Manjunath Ramachandra, Bangalore (IN); Prasanna Hegde, Uttara Kannada (IN)

(73) Assignee: Wipro Limited, Bangalore (IN)

( * ) Notice: Subject to any disclaimer, the term of this patent is extended or adjusted under 35 U.S.C. 154(b) by 95 days.

(21) Appl. No.: 15/712,838

(22) Filed: Sep. 22, 2017

(65) Prior Publication Data
US 2019/0050969 A1 Feb. 14, 2019

(30) Foreign Application Priority Data
Aug. 10, 2017 (IN) .............................. 201741028472

(51) Int. Cl.
G06T 5/00 (2006.01)
G06T 5/50 (2006.01)
G06T 7/00 (2017.01)

(52) U.S. Cl.
CPC .............. *G06T 5/005* (2013.01); *G06T 5/50* (2013.01); *G06T 7/001* (2013.01); *G06T 2207/20081* (2013.01); *G06T 2207/20084* (2013.01)

(58) Field of Classification Search
CPC .......... G06T 5/005; G06T 5/50; G06T 7/001; G06T 2207/20081; G06T 2207/20084
See application file for complete search history.

(56) References Cited

U.S. PATENT DOCUMENTS

| | | | |
|---|---|---|---|
| 7,565,006 B2* | 7/2009 | Stam | B60Q 1/085 315/82 |
| 7,646,889 B2* | 1/2010 | Tsukamoto | B60S 1/0822 382/103 |

(Continued)

FOREIGN PATENT DOCUMENTS

| | | |
|---|---|---|
| CN | 105635527 A | 6/2016 |
| DE | 19521346 A1 | 12/1995 |

OTHER PUBLICATIONS

Fu, et al., "Clearing the Skies: A Deep Network Architecture for Single-Image Rain Removal", Sep. 7, 2016, 11 pages, Retrieved from the Internet:<https://pdfs.semanticscholar.org/9372/bbf7ff37c968905d5471ffa49cd07a09525b.pdf>.

(Continued)

*Primary Examiner* — Mia M Thomas
(74) *Attorney, Agent, or Firm* — Pepper Hamilton LLP

(57) ABSTRACT

Systems and methods for removing rain streak distortion from a distorted video are described. The system receives sample non-distorted images and sample distorted images of a video. The sample non-distorted images are indicative of non-raining condition and the sample distorted images are indicative of raining condition in the video. The system further determines first temporal information from the sample distorted images and second temporal information from the sample non-distorted images. The first temporal information indicative of a change in the rain streak distortion pattern and the second temporal information indicative of a change in a non-rain streak distortion pattern. Further, the system correlates the first temporal information with the second temporal information to generate a training model comprising one or more trained weights. Further, the system removes the rain streak distortion from a real-time distorted (Continued)

video by applying the training model, which results in the generation of the non-distorted video.

18 Claims, 6 Drawing Sheets

(56) References Cited

U.S. PATENT DOCUMENTS

| | | | | |
|---|---|---|---|---|
| 7,805,019 | B2* | 9/2010 | Sheraizin | G06T 5/002 |
| | | | | 348/699 |
| 8,797,417 | B2* | 8/2014 | Gayko | G06T 5/005 |
| | | | | 348/154 |
| 8,914,197 | B2* | 12/2014 | Chen | B60S 1/0833 |
| | | | | 250/574 |
| 9,045,112 | B2* | 6/2015 | Kracker | G06K 9/00791 |
| 9,077,869 | B2* | 7/2015 | Tripathi | G06T 5/005 |
| 9,258,531 | B2* | 2/2016 | Jia | G06T 5/005 |
| 9,355,438 | B2* | 5/2016 | Mehta | G06T 5/006 |
| 9,406,132 | B2* | 8/2016 | Martinez Bauza | H04N 19/597 |
| 9,648,334 | B2* | 5/2017 | Zheng | H04N 19/197 |
| 10,033,922 | B1* | 7/2018 | Tanner | H04N 5/23219 |
| 10,049,284 | B2* | 8/2018 | Jain | G06K 9/00791 |
| 2008/0089414 | A1* | 4/2008 | Wang | H04N 21/44209 |
| | | | | 375/240.13 |
| 2010/0303338 | A1* | 12/2010 | Stojancic | G06K 9/00744 |
| | | | | 382/154 |
| 2011/0032328 | A1* | 2/2011 | Raveendran | H04N 13/10 |
| | | | | 348/43 |
| 2014/0347487 | A1* | 11/2014 | Ahiad | G06K 9/00798 |
| | | | | 348/148 |
| 2015/0015711 | A1* | 1/2015 | Ahiad | B60S 1/0844 |
| | | | | 348/148 |
| 2016/0037170 | A1* | 2/2016 | Zhang | H04N 19/142 |
| | | | | 375/240.12 |
| 2018/0005393 | A1* | 1/2018 | Senthamil | G06F 1/163 |
| 2018/0253825 | A1* | 9/2018 | Andreopoulos | G06T 3/4046 |
| 2018/0254064 | A1* | 9/2018 | Gonzalez-Banos | |
| | | | | G06K 9/00751 |

OTHER PUBLICATIONS

Yang et al., Deep Joint Rain Detection and Removal from a Single Imagel,Mar. 13, 2017, 10 pages, Retrieved from the Internet:<https://arxiv.org/pdf/1609.07769.pdf>.
Rajalakshmi et al., "IJMTES—Video Deraining and Desnowing Using Temporal Correlation and Low Rank Detection", Journal, 2016, pp. 39-46, vol. 03, Issue 07 2016, Retrieved from the Internet:<http://jmtes.com/archive/vol3issue7/vol3iss7p10>.
Divya et al., "A Review onRemoval of Rain Streaks From a Video", 2016, 5 pages, ISRASE.

* cited by examiner

METHOD AND SYSTEM FOR REMOVAL OF RAIN STREAK DISTORTION FROM A VIDEO

This application claims the benefit of Indian Patent Application Serial No. 201741028472 filed Aug. 10, 2017, which is hereby incorporated by reference in its entirety.

FIELD

The present disclosure relates in general to image processing and deep learning. More particularly, but not exclusively, the present disclosure discloses a method and system for removing rain streak distortion from a distorted video.

BACKGROUND

Some of the widely used applications like surveillance and autonomous driving of vehicles are highly dependent on video quality. The video captured using various devices differs in the quality based on several external factors like weather, rain, snowfall, distortion, and the like. Due to these factors, the captured video becomes unclear or noisy which ultimately degrades the quality of the video. For example, the video captured during a raining condition contains rain streaks (i.e., noise) which makes the video unclear. Objects in the captured video may get occluded due to the rain streaks.

Sometimes the objects are occluded to the extent that the objects become completely unclear in the video. It becomes a challenge for surveillance system or monitoring system to detect the occluded objects from the video. Some techniques are available for removing the noise (rain streaks) from the video, however, those techniques fail to produce a clear image or video after rain streak removal. For example, there exist some techniques like simple temporal filtering methods, which are not effective in removing rain streaks since they are spatially invariant and hence degrade the quality of the final image/video that is generated. The other techniques use a method which explicitly detects pixels affected by rain and removes only the rain streaks in those pixels, preserving the temporal frequencies due to object and camera motions. In such cases also, severely defocused rain streaks are not removed and the analysis of other types of dynamics in the rain such as splashing of raindrops or steady effects of rain are not considered, making such methods less effective. The objects from such poorly generated videos/images are not distinguishable, thereby leading to the failure of the surveillance system or the monitoring system.

SUMMARY

Accordingly, the present disclosure relates to a method of removing rain streak distortion from a distorted video. The method includes receiving a plurality of sample non-distorted images and a plurality of sample distorted images of a video. The plurality of sample non-distorted images are indicative of a non-raining condition in the video and the plurality of sample distorted images are indicative of a raining condition in the video. The method further includes determining a first temporal information from the plurality of sample distorted images and a second temporal information from the plurality of sample non-distorted images. The first temporal information, indicative of a change in the rain streak distortion pattern, comprises a plurality of first set of pixel values corresponding to the plurality of sample distorted images. Further, the second temporal information, indicative of a change in a non-rain streak distortion pattern, comprises a plurality of second set of pixel values corresponding to the plurality of sample non-distorted images. The method further includes correlating the first temporal information with the second temporal information based on the plurality of first set of pixel values and the plurality of second set of pixel values. Further, the method includes generating a training model comprising one or more trained weights based on the correlation. The method further includes removing the rain streak distortion from a real-time distorted video by applying the training model. The removal of the rain streak distortion results in the generation of the non-distorted video.

Further, the present disclosure relates to a system for removing rain streak distortion from a distorted video. The system comprises a processor and a memory communicatively coupled to the processor. The system further comprises a model generator, a video capturing unit, a real-time image sequence generator, an image generating unit, and a video convertor. The model generator receives a plurality of sample non-distorted images and a plurality of sample distorted images of a video. The plurality of sample non-distorted images are indicative of a non-raining condition in the video and the plurality of sample distorted images are indicative of a raining condition in the video. Further, the model generator determines a first temporal information from the plurality of sample distorted images and a second temporal information from the plurality of sample non-distorted images. The first temporal information, indicative of a change in the rain streak distortion pattern, comprises a plurality of first set of pixel values corresponding to the plurality of sample distorted images. Further, the second temporal information, indicative of a change in a non-rain streak distortion pattern, comprises a plurality of second set of pixel values corresponding to the plurality of sample non-distorted images. The model generator further correlates the first temporal information with the second temporal information based on the plurality of first set of pixel values and the plurality of second set of pixel values. Further, the model generator generates a training model comprising one or more trained weights based on the correlation. Further, the video convertor removes the rain streak distortion from a real-time distorted video by applying the training model. The removal of the rain streak distortion results in the generation of the non-distorted video.

Furthermore, the present disclosure relates to a non-transitory computer readable medium including instructions stored thereon that when processed by at least one processor cause a system to perform the acts of receiving a plurality of sample non-distorted images and a plurality of sample distorted images of a video. The plurality of sample non-distorted images are indicative of a non-raining condition in the video. Further, the plurality of sample distorted images are indicative of a raining condition in the video. The instructions further cause the at least one processor to determine a first temporal information from the plurality of sample distorted images and a second temporal information from the plurality of sample non-distorted images. The first temporal information, indicative of a change in the rain streak distortion pattern, comprises a plurality of first set of pixel values corresponding to the plurality of sample distorted images. Further, the second temporal information, indicative of a change in a non-rain streak distortion pattern, comprises a plurality of second set of pixel values corresponding to the plurality of sample non-distorted images. The instructions further cause the at least one processor to correlate the first temporal information with the second temporal information based on the plurality of first set of pixel values and the plurality of second set of pixel values. The instructions further cause the at least one processor to generate a training model comprising one or more trained weights based on the correlation. The instructions further cause the at least one processor to remove the rain streak distortion from a real-time distorted video by applying the training model. The removal of the rain streak distortion results in the generation of the non-distorted video.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
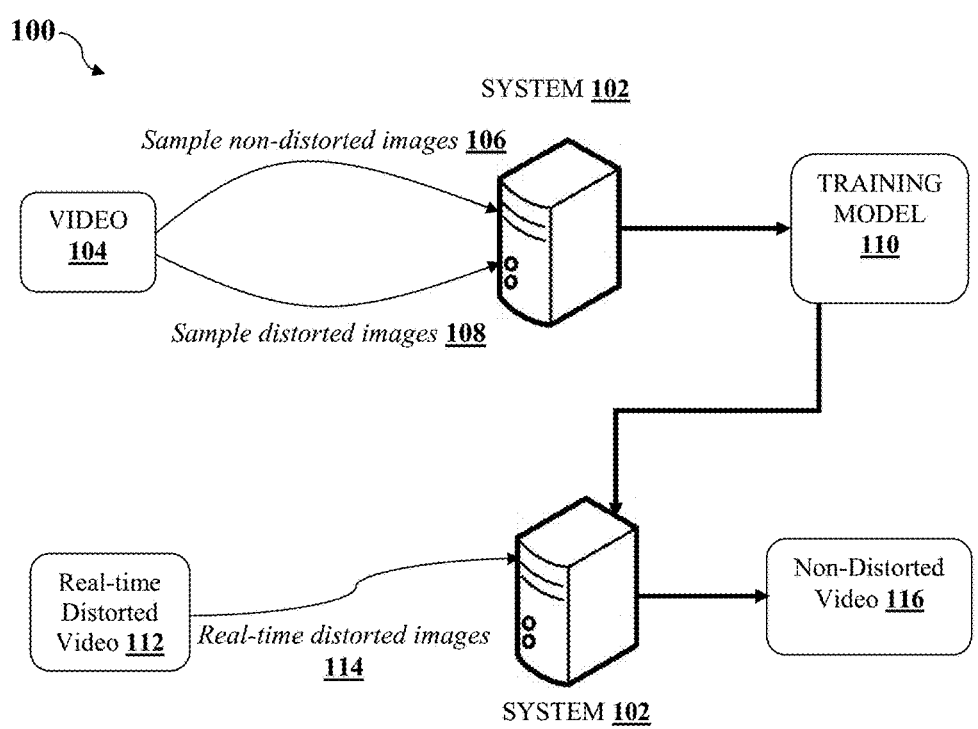
FIG. 1 is an exemplary environment illustrating a system for removing rain streak distortion from a distorted video, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for removing rain streak distortion from a distorted video. Although, the method for removing the rain streak distortion from the distorted video is described in conjunction with a server, the said method can also be implemented in various computing systems/devices, other than the server. According to embodiments of present disclosure, the system utilizes a deep learning mechanism for removing the rain streak distortion from the distorted video.

The rain streaks degrade the visual quality of the video captured by various devices. The video is generally used for practical applications like video surveillance, providing driving assistance to a driver, event detection, object detection, tracking, scene analysis, classification, motion tracking and the like. Since these applications are dependent on the video, the quality must be high for effective implementation of the applications. The system disclosed in the present disclosure provides a learning mechanism, in which, the system learns about different rain streak patterns from sample videos. In other words, the system analyzes a set of sample videos having different raining conditions to understand the different raining patterns.

The in-built learning mechanism helps the system to analyze the raining patterns for effective implementation of the aforementioned applications. According to some embodiments, the distorted video is split into images/frames, and from each image/frame the system learns about how the rain streaks are moving from one image/frame to another. Once the system gets trained, it takes real-time input i.e., real-time video for analyzing the rain streak patterns. As an example, the real-time video may be taken from a vehicle moving in the raining condition. The system splits the real-time video into real-time images/frames to detect the rain streak patterns by implementing the leaning mechanism to provide a real-time assistance to the driver of the vehicle. This way, the system not only removes the rain streak distortion from the real-time video but also maintains the quality of the real-time video, which is explained in detail in subsequent paragraphs of the specification.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an exemplary environment illustrating a system for removing rain streak distortion from a distorted video in accordance with some embodiments of the present disclosure.

The environment 100 includes a system 102, a video 104, sample non-distorted images 106, sample distorted images 108, a training model 110, a real-time distorted video 112, real-time distorted images 114, and non-distorted video 116. The video 104 may be a sample video from which the sample non-distorted images 106 and the sample distorted images 108 are received by the system 102. According to embodiments, the sample non-distorted images 106 indicate the non-raining condition in the video 104, whereas the sample distorted images 108 indicate the raining condition in the video 104.

By providing the two different images i.e., non-distorted and distorted, it helps the system 102 to analyze the video 104 in two different scenarios (i.e., non-raining and raining). In other words, the system 102 analyzes rain streak distortion from the sample distorted images 108 and learns from such analysis. As an example, the learning is based on the deep learning mechanism. Based on the learning of the rain streak patterns, the system 102 generates a training model 110 which is further implemented during the real-time video/image cleaning.

The system 102, after getting trained, receives the real-time distorted images 114 of the real-time distorted video 112. In one example, the real-time distorted video 112 may be a video indicating raining condition on a road, in which, the driver may require a real-time assistance while driving. In another example, the real-time distorted video 112 may be a video indicating a raining condition on an airplane landing track, in which, an air traffic controller may require a real-time assistance for providing clearance for the landing. In both the above examples, the system 102 implements its learning by applying the training model 110 upon the real-time distorted images 114. Based on the applying, the system 102 may identify the rain streak distortion from the real-time distorted images 114. Further, the system 102 removes the identified rain streak distortion and generates a non-distorted video 116.

Figure 2:
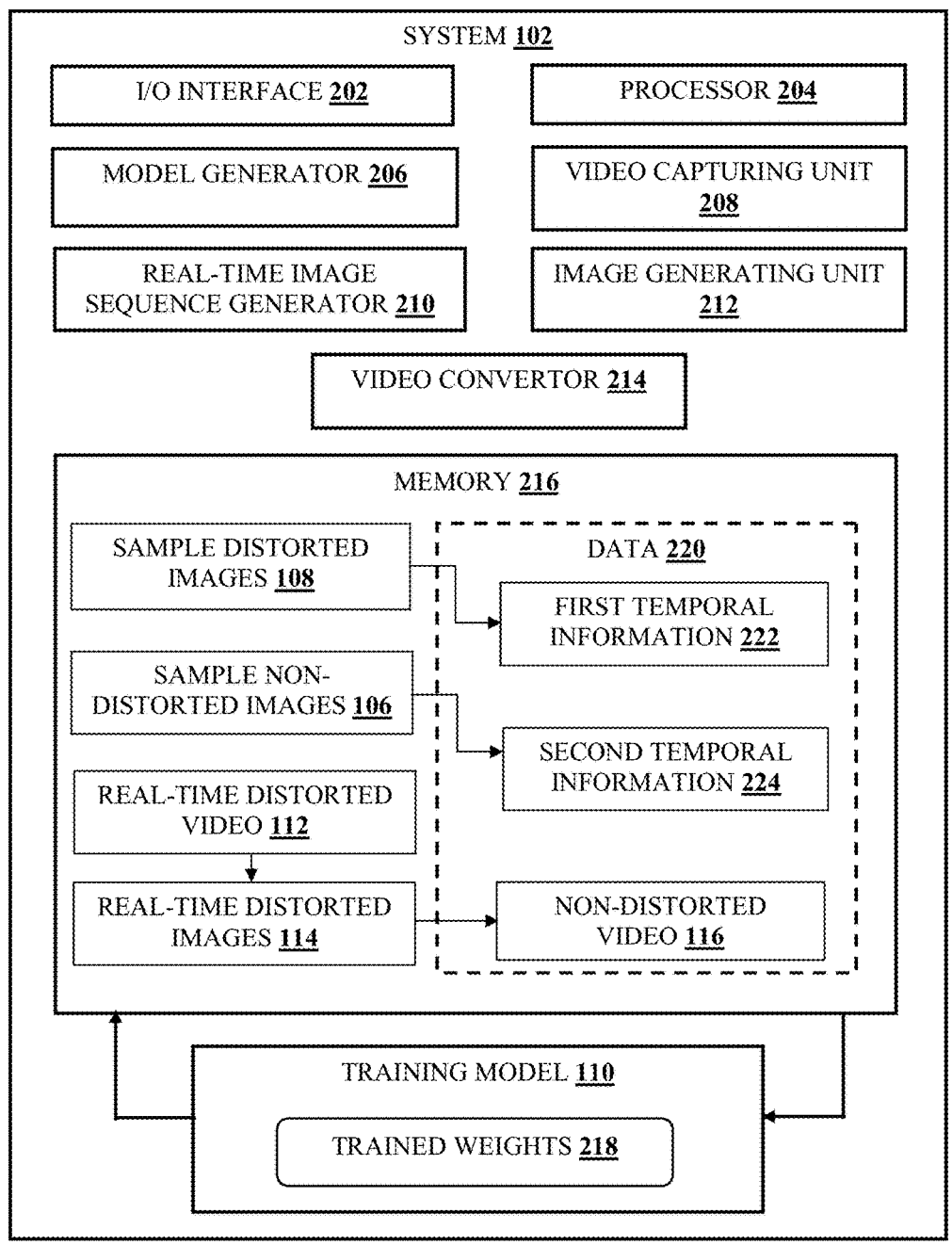
FIG. 2 is a detailed block diagram illustrating the system, in accordance with some embodiments of the present disclosure.

FIG. 2 is a detailed block diagram illustrating the system in accordance with some embodiments of the present disclosure.

The system 102 comprises an I/O interface 202, a processor 204, a model generator 206, a video capturing unit 208, a real-time image sequence generator 210, an image generating unit 212, a video convertor 214, a memory 216, and a training model 110. The memory 216 is communicatively coupled to the processor 204. The processor 204 is configured to perform one or more functions of the system 102 for removing rain streak distortion from a distorted video. In one implementation, the memory 216 comprises sample distorted images 108, sample non-distorted images 106, real-time distorted video 112, and real-time distorted images 114. The memory 216 further comprises a data 220. In an embodiment, the data 220 may include, without limitation, a first temporal information 222, a second temporal information 224, and a non-distorted video 116. Further, the training model 110 comprises one or more trained weights 218.

In one embodiment, the data 220 may be stored within the memory 216 in the form of various data structures. Additionally, the aforementioned data 220 can be organized using data models, such as relational or hierarchical data models.

In an embodiment, the sample distorted images 108 and the sample non-distorted images 106 may be received from the video 104 (as shown in FIG. 1). The first temporal information 222 may indicate a change in the rain streak distortion pattern in the sample distorted images 108. Further, the second temporal information 224 may indicate a change in the non-rain streak distortion pattern in the sample non-distorted images 106.

In an embodiment, the data 220 may be processed by one or more components (206-214) of the system 102. In one implementation, the one or more components (206-214) may also be stored as a part of the processor 204. In an example, the one or more components (206-214) may be hardware components which may be communicatively coupled to the processor 204 for performing one or more functions of the system 102.

As discussed earlier, the system 102, at first, builds a training model 110 by analyzing sample images and videos to understand rain streak patterns. Once the system 102 is trained for detecting the rain streak patterns, it is implemented upon the real-time distorted videos/images to generate clean video/images. In an embodiment, a model generator 206 may receive the plurality of sample non-distorted images 106 and the plurality of sample distorted images 108 of the same video 104 through the I/O interface 202. According to some embodiments, the video 104 may be a high frame rate video captured by a high frame rate video camera. The high frame rate video may be stored in a high frame rate video database which may be either stored in a memory 216 or may be external to the system 102. In case the high frame rate video database is external, the system 102 may fetch the high frame rate video (i.e., video 104) by employing various communication protocols.

According to some embodiments, the communication protocols or standards may comprise wireless connections such as Bluetooth, near field communication (NFC), FireWire, Camera Link®, USB 2.0, USB 3.0, GigE, IEEE-1394, serial bus, infrared, PS/2 port, Bayonet Neill-Concelman (BNC) connector, coaxial, component, composite, digital visual interface (DVI), high-definition multimedia interface (HDMI), radio frequency (RF) antennas, S-Video, video graphics array (VGA), IEEE 802.n/b/g/n/x, cellular (e.g., code-division multiple access (CDMA), highspeed packet access (HSPA+), global system for mobile communications (GSM), longterm evolution (LTE), WiMax, and the like.

According to some embodiments, the system 102 may convert the high frame rate video into standard frame rate video for analysis. The system 102 may further convert the standard frame rate video and the high frame rate video into the plurality of sample non-distorted images 106 and the plurality of sample distorted images 108 respectively. According to an embodiment, the system 102 may augment the high frame rate video with temporal dynamics (i.e., change in the images over time) to simulate rain streak distortions.

The plurality of sample non-distorted images 106 may indicate a non-raining condition in the video 104. Whereas, the plurality of sample distorted images 108 may indicate a raining condition in the video 104. In this way, the system 102 receives images of the same video in two different scenarios i.e., in raining and non-raining conditions which helps to train the training model 110 of the system 102.

Once the distorted 108 and the non-distorted images 106 are received, the model generator 206 processes them to determine the first temporal information 222 and the second temporal information 224 by using different techniques. In one example, the temporal information (the first temporal information and the second temporal information) may be determined using pixel to pixel difference between "Y" components of consecutive frames associated with the plurality of sample distorted images 108, and the plurality of sample non-distorted images 106. In another example, the temporal information may be determined using down sampling of one or more frames associated with the plurality of sample distorted images 108, and the plurality of sample non-distorted images 106. In yet another example, the temporal information may be determined by using an optical flow measurement between the one or more frames by determining flow parameters. The flow parameters may be determined using Kanade-Lucas-Tomasi (KLT) technique. In yet another example, the temporal information may be determined by using pixel wise motion vectors technique.

According to embodiments of present disclosure, the model generator 206 generates the first temporal information 222 from the plurality of sample distorted images 108. The first temporal information 222 comprises a plurality of first set of pixel values corresponding to the plurality of sample distorted images 108. The pixel values indicate the location of the rain streaks in the sample distorted images 108. Thus, by having the pixel values (first set) for the sample distorted images 108, the system 102 learns about the pattern or changes of the rain streaks from one distorted image to another distorted image (i.e., across the plurality of sample distorted images) over a time interval.

Accordingly, the system 102 also learns from the second temporal information 224 generated from the plurality of sample non-distorted images 106. According to embodiments, the second temporal information 224 comprises a plurality of second set of pixel values corresponding to the plurality of sample non-distorted images 106. In this case, the second set of pixels indicates location of objects occluded due to the rain streaks. Thus, by having the pixel values (second set) for all the non-distorted images 106, the system 102 learns about the pattern or changes of the non-rain streaks from one non-distorted image to another non-distorted image (i.e., across the plurality of sample non-distorted images) over a time interval.

Now, in next step, the model generator 206 performs correlation between the first temporal information 222 and the second temporal information 224 to finally generate the training model 110 which helps the system 102 to remove the rain streaks in real-time. The correlation is performed by comparing the plurality of first set of pixel values with the plurality of second set of pixel values to determine a difference between pixel values. The pixel difference is nothing but pixels values of missing/occluded objects in the distorted images which are hidden by the rain streaks. Based on the difference in the pixel values determined during the comparison, the model generator 206 reconstructs the images i.e., generating a plurality of reconstructed images.

As discussed earlier, it can be observed from the plurality of reconstructed images that the objects are occluded due to the rain streaks. Also, there may be a difference between pixel values of the plurality of reconstructed images and plurality of sample non-distorted images 106 which needs to be adjusted. In other words, there would be similarity error between the plurality of reconstructed images and the plurality of sample non-distorted images 106.

To minimize the similarity error, the model generator 206 generates one or more weights 226 which are applied on the plurality of reconstructed images to make it similar to the plurality of sample non-distorted images 106. Thus, based on the application of the one or more weights, the system 102 learns about the rain streak patterns and its removal from the distorted images/video.

Once the system 102 gets trained, it may be implemented in a real-time operation for removing the rain streak pattern from the distorted videos. According to an embodiment, the video capturing unit 208 of the system 102 may receive or capture the real-time distorted video 112. The real-time distorted video 112 may be captured using the high frame rate video camera or the video capturing unit 208. The captured real-time distorted video 112 may transferred to the real-time image sequence generator 210 by using above discussed communication protocols/standards. As discussed in above examples, the real-time distorted video 112 may be a video indicating raining condition on a road, in which, the driver may require a real-time assistance while driving. To provide the real-time assistance, the rain streaks must be removed from the video. The generation of the training model 110 and the application of the training model 110 is explained below with the help of FIGS. 3*a* and 3*b*.

Figure 3A:
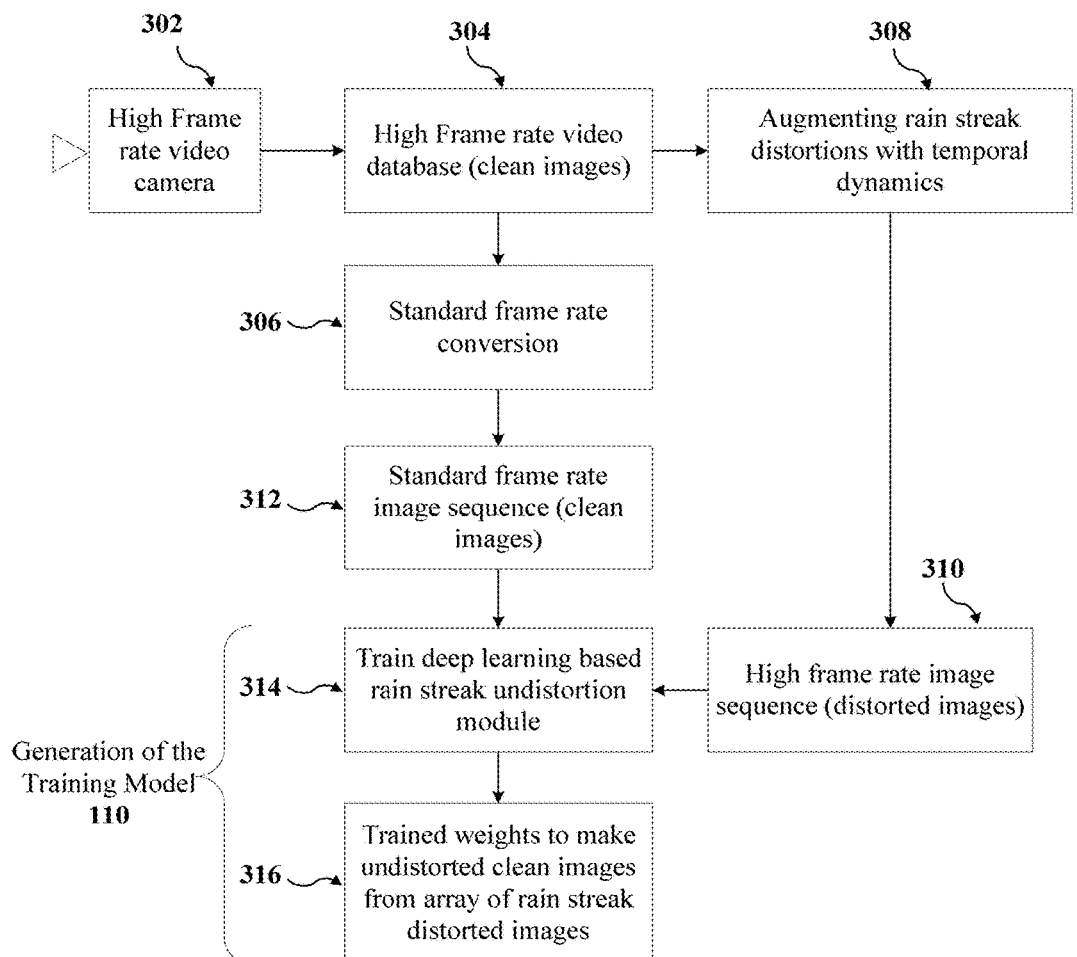
FIGS. 3a and 3b illustrate generating a training model and applying the training model for removing rain streak distortion from a real-time distorted video respectively, in accordance with some embodiments of the present disclosure.
Figure 3B:
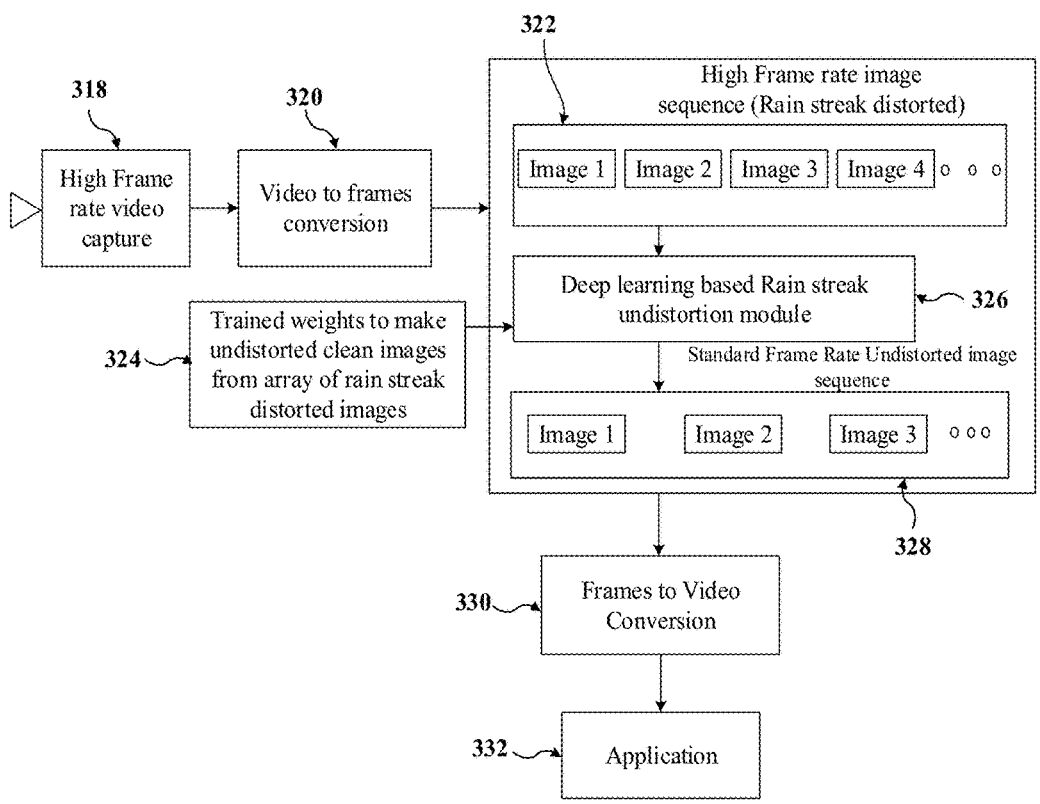

FIGS. 3*a* and 3*b* illustrate generating the training model 110 and applying the training model 110 for removing rain streak distortion from a real-time distorted video respectively, in accordance with some embodiments of the present disclosure. Referring to FIG. 3*a*, it can be observed that at block 302, the high frame rate video camera captures the non-distorted video or clean video which is transferred to the high frame rate video database (block 304). From the high frame rate video database, in one aspect, the non-distorted video is converted into the standard frame rate video (block 306). Whereas, in another aspect, the non-distorted video is augmented with temporal dynamics to simulate rain streak distortions (block 308). Based on the augmentation, a distorted video is generated which converted into a high frame rate distorted image sequence as shown in block 310.

On the other hand, the standard frame rate video of block 306 is converted a standard frame rate clean image sequence as shown in block 312. Now, both the high frame rate distorted image sequence and the standard frame rate clean image sequence is used for generating the training model 110 which can be seen in blocks 314 and 316. For example, at block 314, a deep learning mechanism is used to learn about the rain streak distortion or rain streak pattern from both the high frame rate distorted image sequence and the standard frame rate clean image sequence. Based on the learning, trained weights are generated to remove the rain streaks from a real-time video as shown in block 316.

Now referring to FIG. 3*b*, the high frame rate video camera captures a high frame distorted video i.e., real-time distorted video having rain streaks as shown in block 318. The high frame distorted video is converted into frame/image sequence (block 320) for further processing. As an example, image sequence having six images i.e., Image 1, Image 2, . . . Image 6 is shown in block 322. Since the image sequence are distorted with the rain streaks, the training model 110 (generated in FIG. 3*a*) is applied upon the image sequence. In other words, the trained weights as shown in block 324 is applied using deep learning mechanism (block 326) upon the image sequences. Thus, based on the application of the trained weights, distorted image sequences are converted into standard frame rate non-distorted/clean image sequences as shown in block 328. Further, at block 330, the non-distorted/clean image sequences are converted into non-distorted video which may be used for various applications (block 332). Further, in subsequent paragraphs, the removal of the rain streaks from the real-time distorted video 112 is explained in detail.

For removing the rain streaks, in the first step, the real-time image sequence generator 210 may convert the real-time distorted video 112 into a plurality of real-time distorted images 114. The objective of converting the video into images is to fetch the pixel values on which the training model 110 can be applied. Thus, the image generating unit 212 of the system 102 applies the one or more trained weights 218 of the training model 110 upon the pixel values of the real-time images for determining a real-time rain streak distortion pattern.

Considering an example, in which, pixel values determined for a real-time distorted image is (1, 2), (1, 2), (2, 4) and (3, 1), whereas the original pixel values of the same real-time non-distorted image is (3, 4), (3, 4), (4, 6) and (5, 3). In the instant example, it can be observed that there is pixel difference of "2" in X and Y components. Thus, to compensate the difference, the system 102 may apply the trained weight "2" upon the pixel values of the real-time distorted image i.e., (1, 2), (1, 2), (2, 4) and (3, 1). Upon applying the trained weight 2, the distorted pixel values become similar to the original pixel values. Thus, the rain streak pattern is removed and the plurality of real-time distorted images 114 are converted into a plurality of real-time non-distorted images. Further, the video convertor 214 converts the plurality of real-time non-distorted images into the non-distorted video 116 which may be used for various applications.

Figure 4:
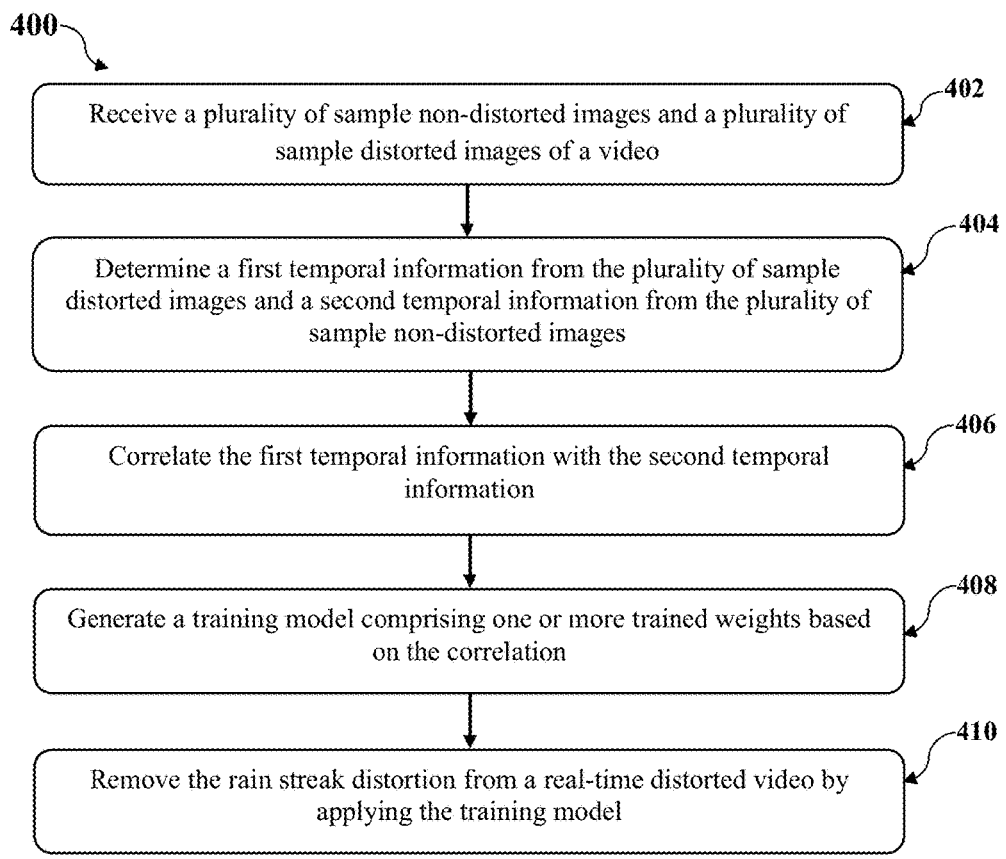
FIG. 4 is a flowchart illustrating a method of removing rain streak distortion from a distorted video, in accordance with some embodiments of the present disclosure.

FIG. 4 is a flowchart illustrating a method of removing rain streak distortion from a distorted video in accordance with some embodiments of the present disclosure.

As illustrated in FIG. 3, the method 400 comprises one or more blocks for removing rain streak distortion using a system 102. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 402, the method 400 includes receiving, by a model generator 206, a plurality of sample non-distorted images 106 and a plurality of sample distorted images 108 of a video 104. The plurality of sample non-distorted images 106 are indicative of a non-raining condition in the video 104, whereas the plurality of sample distorted images 108 are indicative of a raining condition in the video 104.

At block 404, the method 400 includes determining, by the model generator 206, a first temporal information 222 from the plurality of sample distorted images 108 and a second temporal information 224 from the plurality of sample non-distorted images 106. The first temporal information 222 which is indicative of a change in the rain streak distortion pattern comprises a plurality of first set of pixel values corresponding to the plurality of sample distorted images 108. Further, the second temporal information 224 which is indicative of a change in a non-rain streak distortion pattern comprises a plurality of second set of pixel values corresponding to the plurality of sample non-distorted images 106.

At block 406, the method 400 includes correlating, by the model generator 206, the first temporal information 222 with the second temporal information 224 based on the plurality of first set of pixel values and the plurality of second set of pixel values.

At block 408, the method 400 includes generating, by the model generator 206, a training model 110 comprising one or more trained weights 218 based on the correlation.

At block 410, the method 400 includes removing, by a video convertor 214, the rain streak distortion from a real-time distorted video 112 by applying the training model 110. Further, the removal of the rain streak distortion results in the generation of the non-distorted video 116.

Figure 5:
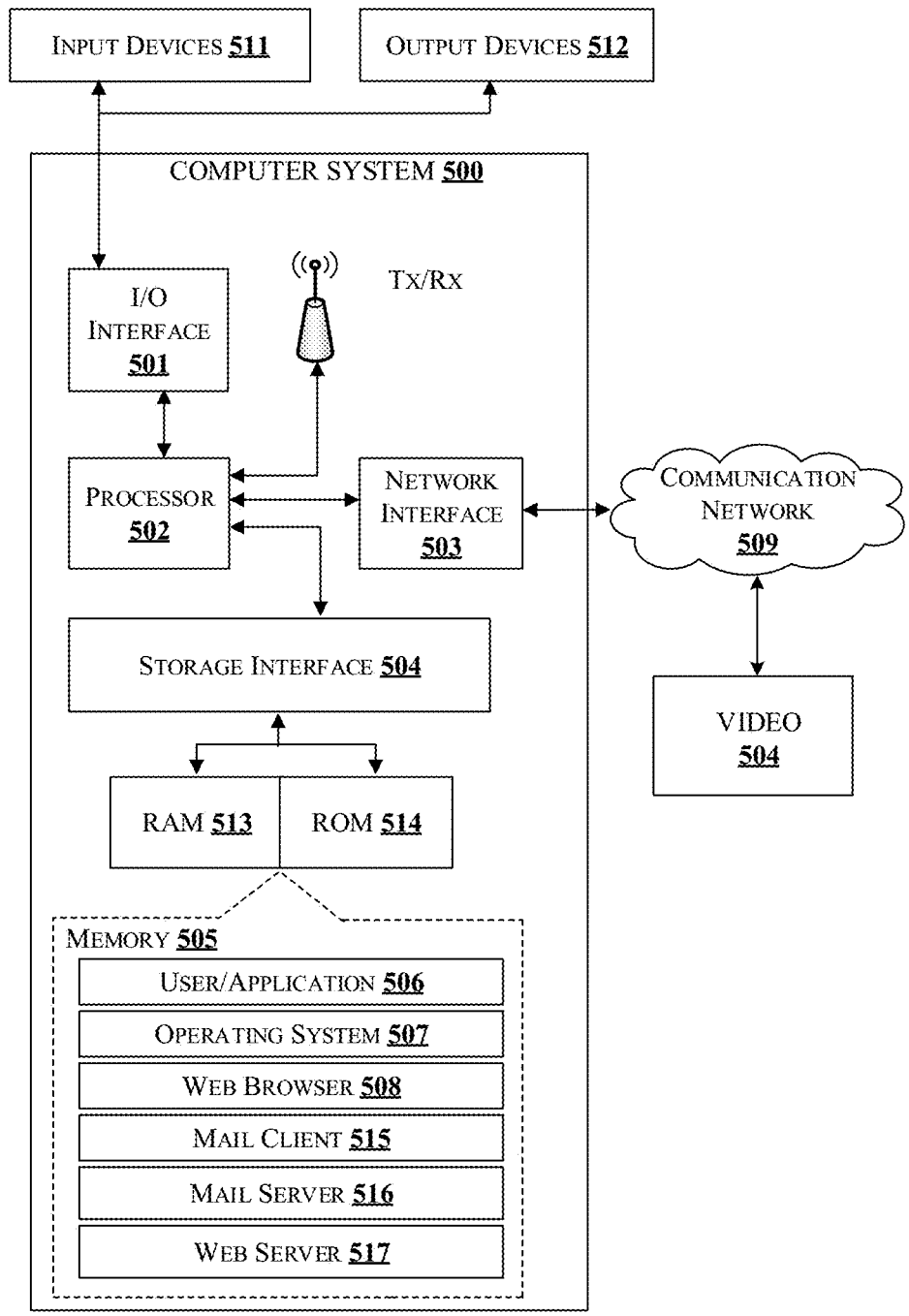
FIG. 5 is a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 can be the system 102 which is used for removing rain streak distortion from a distorted video. According to an embodiment, the computer system 500 may receive sample distorted images 108 and sample non-distorted images 106 of same video 104 for training a training model 110. The computer system 400 may further receive real-time distorted video 112 from which the distortion is removed using the training model 110. The computer system 400 may comprise a central processing unit ("CPU" or "processor") 502. The processor 502 may comprise at least one data processor for executing program components for executing user- or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web browser 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 501 may facilitate display, execution, interaction, manipulation, or operation of program components through textual or graphical facilities. For example, I/O interface may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method of removing rain streak distortion from videos with varying dynamics of rain.

In an embodiment, the method of present disclosure provides real-time assistance by using a deep learning mechanism to surveillance systems or monitoring systems like self-driving devices.

In an embodiment, the method of present disclosure not only removes the rain streak distortion from the real-time video but also maintains the quality of the real-time video.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims

What is claimed is:

1. A method of removing rain streak distortion from a distorted video, the method comprising:
   receiving, by a model generator, a plurality of sample non-distorted images and a plurality of sample distorted images of a video, wherein the plurality of sample non-distorted images are indicative of a non-raining condition in the video, and wherein the plurality of sample distorted images are indicative of a raining condition in the video;
   determining, by the model generator, a first temporal information from the plurality of sample distorted images and a second temporal information from the plurality of sample non-distorted images, wherein the first temporal information, indicative of a change in a rain streak distortion pattern, comprises a plurality of first set of pixel values corresponding to the plurality of sample distorted images, and wherein the second temporal information, indicative of a change in a non-rain streak distortion pattern, comprises a plurality of second set of pixel values corresponding to the plurality of sample non-distorted images;
   correlating, by the model generator, the first temporal information with the second temporal information based on the plurality of first set of pixel values and the plurality of second set of pixel values;
   generating, by the model generator, a training model comprising one or more trained weights based on the correlation; and
   removing, by a video convertor, the rain streak distortion from a real-time distorted video by applying the training model, wherein removal of the rain streak distortion results in the generation of the non-distorted video.

2. The method as claimed in claim 1, wherein the removing of the rain streak distortion from the real-time distorted video comprises:
   receiving, by a video capturing unit, the real-time distorted video comprising the rain streak distortion,
   converting, by real-time image sequence generator, the real-time distorted video into a plurality of real-time distorted images;
   determining, by an image generating unit, real-time rain streak distortion pattern in the plurality of real-time distorted images by applying the one or more trained weights on the plurality of real-time distorted images;
   generating, by the image generating unit, a plurality of real-time non-distorted images corresponding to the plurality of real-time distorted images by removing the real-time rain streak distortion pattern; and
   converting, by the video converter, the plurality of real-time non-distorted images into the non-distorted video.

3. The method as claimed in claim 1, wherein the correlating of the first temporal information and the second temporal information comprises:
   comparing the plurality of first set of pixel values with the plurality of second set of pixel values to determine a difference between pixel values;
   generating a plurality of reconstructed images based on the comparing; and
   comparing the plurality of reconstructed images with the plurality of sample non-distorted images to determine correlation factor indicating a similarity error between the plurality of reconstructed images and the plurality of sample non-distorted images, wherein the correlation factor is minimized by applying the one or more trained weights such that the plurality of reconstructed images becomes similar to the plurality of sample non-distorted images.

4. The method as claimed in claim 1, wherein the plurality of first set of pixel values, of the first temporal information, indicates change in rain streak distortion pattern across the plurality of sample distorted images over a time interval.

5. The method as claimed in claim 1, wherein the plurality of second set of pixel values, of the second temporal information, indicates a change in non-rain streak distortion pattern across the plurality of sample non-distorted images over a time interval.

6. The method as claimed in claim 1, wherein the training model learns, from the plurality of sample distorted images and the plurality of sample non-distorted images, about the change in the rain streak distortion pattern and the change in the non-rain streak distortion pattern respectively.

7. A system for removing rain streak distortion from a distorted video, wherein the system comprises:
   a processor; and
   a memory communicatively coupled to the processor, wherein the memory stores processor instructions, which, on execution, causes the processor to:
      receive a plurality of sample non-distorted images and a plurality of sample distorted images of a video, wherein the plurality of sample non-distorted images are indicative of a non-raining condition in the video, and wherein the plurality of sample distorted images are indicative of a raining condition in the video,
      determine a first temporal information from the plurality of sample distorted images and a second temporal information from the plurality of sample non-distorted images, wherein the first temporal information, indicative of a change in a rain streak distortion pattern, comprises a plurality of first set of pixel values corresponding to the plurality of sample distorted images, and wherein the second temporal information, indicative of a change in a non-rain streak distortion pattern, comprises a plurality of second set of pixel values corresponding to the plurality of sample non-distorted images,
      correlate the first temporal information with the second temporal information based on the plurality of first set of pixel values and the plurality of second set of pixel values, and
      generate a training model comprising one or more trained weights based on the correlation; and
      remove the rain streak distortion from a real-time distorted video by applying the training model, wherein the removal of the rain streak distortion results in the generation of the non-distorted video.

8. The system as claimed in claim 7, wherein the system removes the rain streak distortion from the real-time distorted video by:
- receiving the real-time distorted video comprising the rain streak distortion;
- converting the real-time distorted video into a plurality of real-time distorted images;
- determining real-time rain streak distortion pattern in the plurality of real-time distorted images by applying the one or more trained weights on the plurality of real-time distorted images;
- generating a plurality of real-time non-distorted images corresponding to the plurality of real-time distorted images by removing the real-time rain streak distortion pattern; and
- converting the plurality of real-time non-distorted images into the non-distorted video.

9. The system as claimed in claim 7, wherein the system performs correlating of the first temporal information and the second temporal information by:
- comparing the plurality of first set of pixel values with the plurality of second set of pixel values to determine a difference between pixel values;
- generating a plurality of reconstructed images based on the comparing, and
- comparing the plurality of reconstructed images with the plurality of sample non-distorted images to determine a similarity error between the plurality of reconstructed images and the plurality of sample non-distorted images, wherein the correlation factor is minimized by applying the one or more trained weights such that the plurality of reconstructed images becomes similar to the plurality of sample non-distorted images.

10. The system as claimed in claim 7, wherein the plurality of first set of pixel values, of the first temporal information, indicates change in rain streak distortion pattern across the plurality of sample distorted images over a time interval.

11. The system as claimed in claim 7, wherein the wherein the plurality of second set of pixel values, of the second temporal information, indicates a change in non-rain streak distortion pattern across the plurality of sample non-distorted images over a time interval.

12. The system as claimed in claim 7, wherein the training model learns, from the plurality of sample distorted images and the plurality of sample non-distorted images, about the change in the rain streak distortion pattern and the change in the non-rain streak distortion pattern respectively.

13. A non-transitory computer-readable storage medium including instructions stored thereon that when processed by at least one processor cause a system to perform operations comprising:
- receiving a plurality of sample non-distorted images and a plurality of sample distorted images of a video, wherein the plurality of sample non-distorted images are indicative of a non-raining condition in the video, and wherein the plurality of sample distorted images are indicative of a raining condition in the video;
- determining a first temporal information from the plurality of sample distorted images and a second temporal information from the plurality of sample non-distorted images, wherein the first temporal information, indicative of a change in a rain streak distortion pattern, comprises a plurality of first set of pixel values corresponding to the plurality of sample distorted images, and wherein the second temporal information, indicative of a change in a non-rain streak distortion pattern, comprises a plurality of second set of pixel values corresponding to the plurality of sample non-distorted images;
- correlating the first temporal information with the second temporal information based on the plurality of first set of pixel values and the plurality of second set of pixel values;
- generating a training model comprising one or more trained weights based on the correlation; and
- removing the rain streak distortion from a real-time distorted video by applying the training model, wherein removal of the rain streak distortion results in the generation of the non-distorted video.

14. The medium as claimed in claim 13, wherein the removing of the rain streak distortion from the real-time distorted video comprises:
- receiving the real-time distorted video comprising the rain streak distortion;
- converting the real-time distorted video into a plurality of real-time distorted images;
- determining real-time rain streak distortion pattern in the plurality of real-time distorted images by applying the one or more trained weights on the plurality of real-time distorted images;
- generating a plurality of real-time non-distorted images corresponding to the plurality of real-time distorted images by removing the real-time rain streak distortion pattern; and
- converting the plurality of real-time non-distorted images into the non-distorted video.

15. The medium as claimed in claim 13, wherein the correlating of the first temporal information and the second temporal information comprises:
- comparing the plurality of first set of pixel values with the plurality of second set of pixel values to determine a difference between pixel values;
- generating a plurality of reconstructed images based on the comparing; and
- comparing the plurality of reconstructed images with the plurality of sample non-distorted images to determine correlation factor indicating a similarity error between the plurality of reconstructed images and the plurality of sample non-distorted images, wherein the correlation factor is minimized by applying the one or more trained weights such that the plurality of reconstructed images becomes similar to the plurality of sample non-distorted images.

16. The medium as claimed in claim 13, wherein the plurality of first set of pixel values, of the first temporal information, indicates change in rain streak distortion pattern across the plurality of sample distorted images over a time interval.

17. The medium as claimed in claim 13, wherein the plurality of second set of pixel values, of the second temporal information, indicates a change in non-rain streak distortion pattern across the plurality of sample non-distorted images over a time interval.

18. The medium as claimed in claim 13, wherein the training model learns, from the plurality of sample distorted images and the plurality of sample non-distorted images, about the change in the rain streak distortion pattern and the change in the non-rain streak distortion pattern respectively.

* * * * *